F. MATHIEU.
ELASTIC WHEEL.
APPLICATION FILED FEB. 26, 1921.
1,436,278.
Patented Nov. 21, 1922.
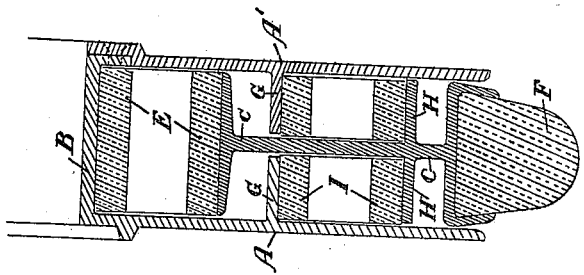
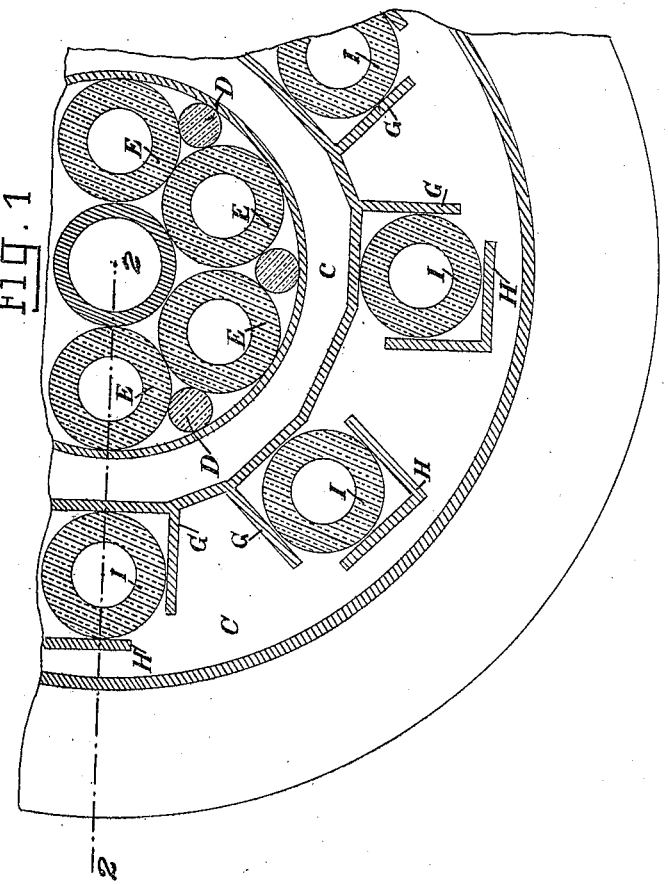
INVENTOR:
François Mathieu
By Wm Wallace White
ATTY.

Patented Nov. 21, 1922.

1,436,278

UNITED STATES PATENT OFFICE.

FRANÇOIS MATHIEU, OF MARSEILLE, FRANCE.

ELASTIC WHEEL.

Application filed February 26, 1921. Serial No. 447,974.

*To all whom it may concern:*

Be it known that I, FRANÇOIS MATHIEU, citizen of the Republic of France, residing at Marseille, in the Republic of France, have invented new and useful Improvements in Elastic Wheels, of which the following is a specification.

This invention relates to resilient driving wheels.

Wheels rendered resilient by the interposition of rubber shock absorbers for example in the form of pneumatic balls round the hub are already known but they have the inconvenience of being only of poor resiliency owing to the fact that the resilient drive of the wheel and the vertical resiliency are not distinct one from the other and cause two opposite forces, perpendicular to one another which allows of the operation of a small number of shock absorbers only which fact is consequently prejudicial to obtaining a maximum resiliency. It has also been proposed to make a resilient wheel by interposing rubber rings between an inner wheel member and an outer rim, said rubber cylinder being separated by projections arranged alternately in the wheel member and rim.

According to the present invention the resilient drive is effected by means independent of those by which the vertical resiliency is obtained the rubber shock absorbers which give the vertical resiliency being enclosed in one chamber having smooth circular walls forming a crown round the hub and being in permanent contact with one another and with the circular walls, which fact allows of their deformation by compression produced by displacement of the hub from the centre due to loads or shocks, while the resilient drive is effected independently through rubber shock absorbers interposed between pairs of supporting brackets, each bracket of the pair being mounted on the driven portion of the wheel and on the tyre carrying portion respectively.

In the annexed drawings which show by way of example one form of construction of the invention:

Fig. I is a view of part of a wheel in longitudinal vertical section and

Fig. 2 is a view in transverse section taken on the line 2—2 of Fig. I.

The elastic wheel is composed of two parts absolutely distinct separated by rubber shock absorbers.

1. Two flanges A A' rigidly connected to a hub B and serving exclusively to impel the carriage.

2. A crown C concentric with the hub, approximating in section to the shape of a double T of which the space between the inner circumference and the hub is filled with solid rubber cylinders D and hollow cylinders E while its outer portion is of U shape in cross section and is provided with a solid rubber tyre F; this crown may come out of centre with the hub axle by deformation of the rubber cylinders D and E caused by the carriage weight.

On the inner faces of flanges A A' and at equal distances from the centre of the hub the supporting brackets G G disposed corresponding to other supporting brackets H. H. each bracket of a pair being arranged on each side of a line passing through the centre of crown C and brackets H H being disposed in opposite senses to the brackets G G. Between these angles G and H are placed rubber cylinders I I and it is the compression of these cylinders between said brackets which causes the elastic impulse of the wheel's central portion and consequently the carriage. The arrangement of the brackets in opposite senses allows for compression of the rubber cylinders running ahead as well as on the reverse.

The independence of the central portion is thus insured by an elastic connection which allows it to stand shocks from the road and to transmit them to the axle after being deadened by the compression of the rubber cylinders.

Starting and braking are made very smooth by the compression of the rubber cylinders interposed between the angles connecting both portions of the wheel.

It is to be noted that the rubber is subject to deformation but is incompressible and that on the other hand, the walling of cells or chambers between which the rubber cylinders are enclosed may be displaced but do not change the volume. It ensues therefore that this wheel's elasticity is always regular because it is due to the deformation of rubber cylinders, which deformation is limited by the unchangeable volume of cells or chambers. It arises therefore from the above arrangement that the rubber cylinders always work under compression even when the carriage is stopping.

Having now particularly described and ascertained the nature of my said invention and in what manner the same is to be performed, I declare that what I claim is:—

A resilient driving wheel, comprising, in combination, a hub having a pair of lateral flange-shaped driving extensions rigidly connected therewith, inwardly extending supporting brackets carried by said extensions and disposed concentrically with relation to the hub, the brackets of one extension projecting towards those of the other, a tire-supporting rim having a centrally disposed internal disk-shaped member extending between said brackets and provided at its center with a cylindrical sleeve concentric with the hub and spaced therefrom, said disk-shaped member having supporting brackets extending from its opposite sides in a direction opposite from that of the first-mentioned brackets and cooperating therewith to form pairs of brackets, a series of cylindrical rubber blocks within the space between the hub and said sleeve in permanent contact with each other and with the walls enclosing said space, and a cylindrical rubber block within the space between each pair of cooperating brackets and permanently in contact with said brackets.

In testimony whereof I have signed my name to this specification.

FRANÇOIS MATHIEU.

Witnesses:
EUGENÈ DUCASSON,
ETIENNE ROMAR.